O. Paddock.
Hay Fork.

No. 88,067.  2 Sheets. Sheet 1.  Patented Mar. 23, 1869.

Witnesses,
C. O. Brown
Wm. F. Hutchinson

Inventor Oscar Paddock by
Geo. E. Brown,
Attorney.

O. Paddock,
Hay Fork.
No. 88067.  2 Sheets Sheet 2.  Patented Mar. 23, 1869.
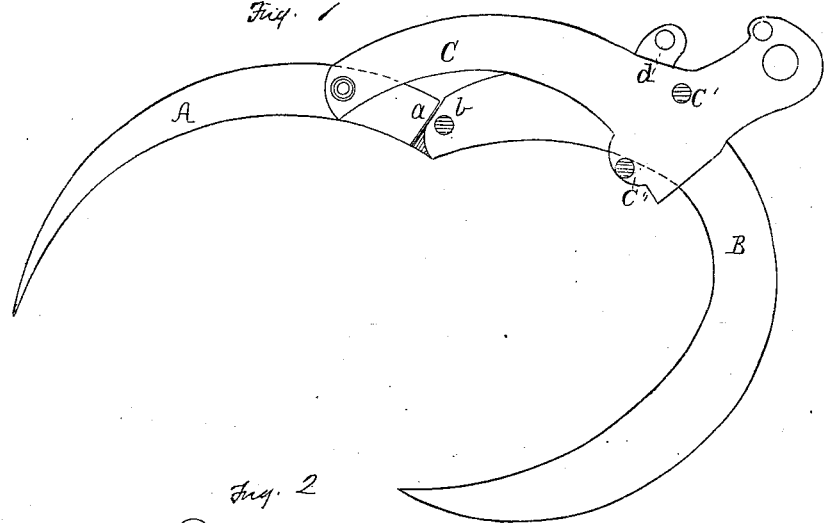
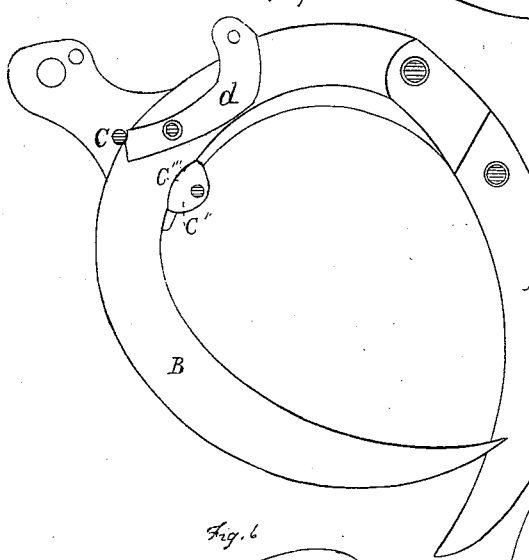
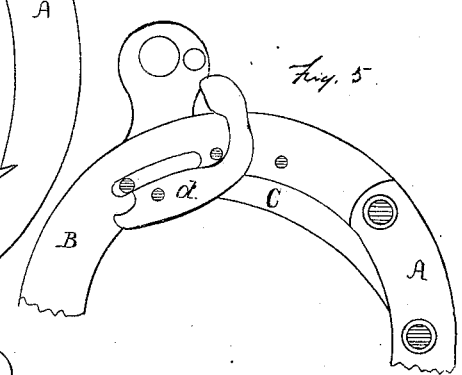
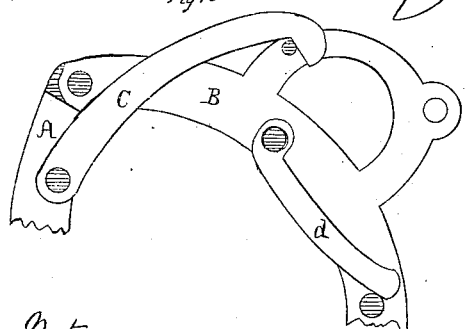
Witnesses
C. O. Brown,
Wm. F. Hutchinson
O. Paddock Inventor by
Geo. E. Brown Atty.

United States Patent Office.

OSCAR PADDOCK, OF WATERTOWN, NEW YORK.

Letters Patent No. 88,067, dated March 23, 1869.

IMPROVEMENT IN HORSE HAY-FORKS.

The Schedule referred to in these Letters Patent and making part of the same.

*To all whom it may concern:*

Be it known that I, OSCAR PADDOCK, of Watertown, in the State of New York, have invented a new and useful Improvement in Horse Hay-Forks; and I do hereby declare that the following is a full, clear, and exact description of the same, reference being had to the accompanying drawings, and letters of reference marked thereon, making a part of this specification, in which—

Figure 1 is a plan view of my fork, with the tines opened, showing the manner in which one tine serves as the handle of the other; also showing the combination of the lifting-ring and locking-bar;

Figure 2 is a plan view, with the tines closed, showing the combination of the locking-bar with the tine B; also the combination of the tines and locking-levers; and Figures 3, 4, 5, and 6, are plan views of other forms of my invention.

Figure 3:
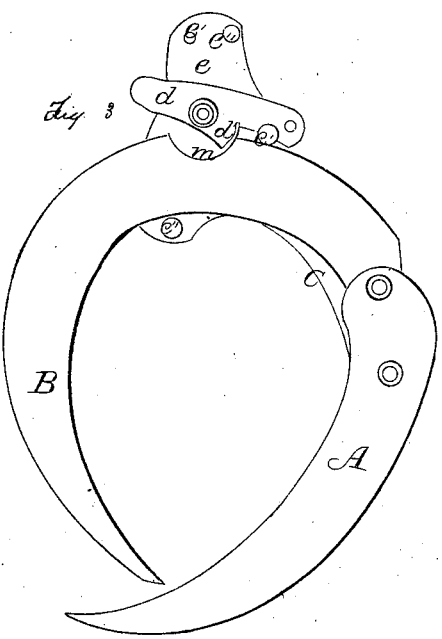
Figure 4:
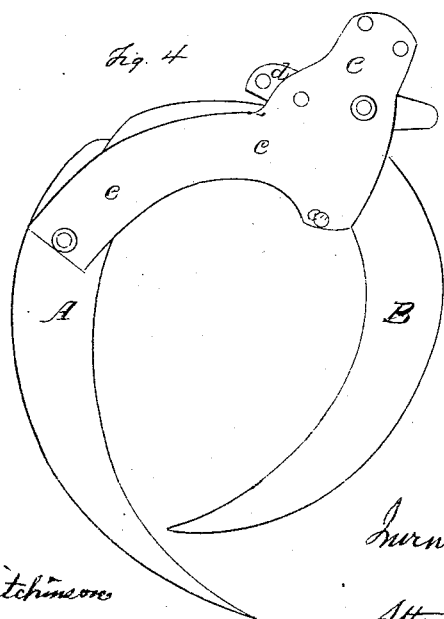

To enable those skilled in the art to make and use my invention, I now proceed to describe its construction and operation.

Similar letters in the drawings refer to like parts.

This invention consists in so combining the two tines of a horse hay-fork that one shall serve as the handle of the other, when the two are spread apart, by means of a shoulder upon one, and a correspondent face upon the other, without the use of any intermediate device.

Also, in forming the attachment, to which the lifting-rope is fastened, upon the locking-bar.

Also, in combining the locking-bar with one of the tines, in such manner that, by the agency of the former, the latter may be raised out of the load.

Also, in combining, with the tines, a new and peculiar mechanism, for locking the same together.

In the drawings—

A B represent two curved tines, of suitable dimensions, which are pivoted together at their stocks.

The tine A is somewhat shorter than the other, and less curved; and out of its upper, or pivoted end is cut a recess, for the reception of the pivoted end of the other tine, B, said recess being bounded by a straight inclined shoulder, *a*.

The upper corner of the pivoted end of the tine B is cut away, so as to form a straight inclined face, *b*; and, when the tines are spread apart to their fullest extent, the face *b* comes in contact with the shoulder *a*, and forms a stop, so that the tine B may be taken hold of, and serve as a handle, to force the tine A into the hay, and this without the aid of any auxiliary device; and thus, if there were nothing but the two tines one having the shoulder, and the other the face, the tine B might still serve perfectly the purpose of a handle for the tine A.

To the latter tine, near its upper end, is pivoted a bar, which is one of the locking-levers, and is curved in the general direction of the tine B, and is in contact therewith, and is provided, near its other end, with two pins, $c'$ $c''$, projecting from it, one upon one side, and the other upon the other side of the tine B, so that the tine moves between the pins, which form a guide-way for the tine B to slide in.

When the fork is holding a load of hay, one, for instance, elevated above the spot where it is to be dropped, by raising the bar *c* upon its pivot, which may be done by means of a rope, the tines having been previously unlocked, in the way described below, the tine B is also raised upon its pivot, or, in other words, its point is drawn away from the point of the tine A, and the load consequently suffered to drop.

The locking-mechanism consists, besides the bar *c*, of the lever *d*, pivoted to the said bar, and on the same side of it as the tine B.

When the tine A has been forced into the hay, as before described, and afterward the tine B has also been forced into the hay, so as to bring it point to point with the tine A, the tooth $d'$, of the lever *d*, is about opposite the curved recess *m* in the upper side of the tine B, and, by depressing the longer arm of the lever *d*, the tooth $d'$ is forced into the said recess.

The tooth and recess are made of corresponding shape, so that one fits the other closely, and the weight of the lever *d* tends to keep the tooth within the recess.

The tines are thus securely locked together, and, to unlock them, it is only necessary to raise the longer arm of the lever *d*, which may be done by means of a rope, fastened thereto, and passed through a hole, $e''$, in the projecting part of the bar *c*.

The tooth $d'$ is thus withdrawn from the recess *m*, and the bar *c* left free to be raised, as above explained.

The aforesaid projecting part of the bar *c*, being pierced with the orifice $e'$, for a rope, forms the lifting-attachment of the fork, when the tines are locked together, it being so placed as to be about opposite the points when they come in contact, and, by means of the pivot of its bar *c*, and the pin $c''$ of the same, drawing upon both tines at the same time, when the lifting-force is exerted upon it.

What I claim as new, and desire to secure by Letters Patent, is—

1. So combining the two tines of a horse hay-fork that one shall serve as the handle of the other, when the two are spread apart, by means of a shoulder upon one, and a correspondent face upon the other, without the use of any auxiliary device, substantially as described.

2. The combination of the lifting-attachment *e* with the locking-bar *c*, as and for the purpose set forth.

3. The arrangement of the locking-bar *c* with the tine B, in the manner and for the purpose set forth.

4. The arrangement of the tines A B with the locking-levers *c d*, in the manner and for the purpose set forth.

OSCAR PADDOCK.

Witnesses:
E. L. PADDOCK,
B. R. MEIGS.